US012179327B2

(12) United States Patent
Baudrand

(10) Patent No.: US 12,179,327 B2
(45) Date of Patent: Dec. 31, 2024

(54) FASTENER DRIVING DEVICE

(71) Applicant: Illinois Tool Works Inc., Glenview, IL (US)

(72) Inventor: Olivier Baudrand, Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 28 days.

(21) Appl. No.: 18/254,001

(22) PCT Filed: Dec. 7, 2021

(86) PCT No.: PCT/US2021/062209
§ 371 (c)(1),
(2) Date: May 23, 2023

(87) PCT Pub. No.: WO2022/132501
PCT Pub. Date: Jun. 23, 2022

(65) Prior Publication Data

US 2023/0405783 A1 Dec. 21, 2023

(30) Foreign Application Priority Data

Dec. 16, 2020 (EP) .................................... 20214520

(51) Int. Cl.
*B25C 1/08* (2006.01)
*B25C 1/00* (2006.01)

(52) U.S. Cl.
CPC ................ *B25C 1/08* (2013.01); *B25C 1/008* (2013.01)

(58) Field of Classification Search
CPC .. B25C 1/08; B25C 1/008; B25C 1/06; B25C 1/047; B25C 1/04; B25C 1/042;
(Continued)

(56) References Cited

U.S. PATENT DOCUMENTS

| | | | |
|---|---|---|---|
| 32,452 | A | 5/1861 | Phelps |
| 3,523,489 | A | 8/1970 | Perkins |

(Continued)

FOREIGN PATENT DOCUMENTS

| | | | |
|---|---|---|---|
| CA | 2161907 | A1 | 5/1996 |
| EP | 0251684 | A1 | 1/1988 |

(Continued)

OTHER PUBLICATIONS

"International Preliminary Report on Patentability", from PCT/US2021/062209, May 5, 2023.

(Continued)

*Primary Examiner* — Veronica Martin
(74) *Attorney, Agent, or Firm* — Neal, Gerber & Eisenberg LLP

(57) ABSTRACT

A fastener driving device comprising a pressure chamber, a first piston, a fastener channel and a second piston. The first piston is coupled to the pressure chamber such that pressurized gas in the pressure chamber causes the first piston to slide from a first position to a second position. The fastener channel is configured to receive a fastener, wherein when moving from the first position to the second position the first piston is configured to engage a fastener and drive it from the device. The second piston is slidable within a sleeve and arranged such that when the first piston slides from the first position to the second position the first piston drives the second piston and compresses gas within the sleeve. Compressed gas in the sleeve biases the first piston towards the first position.

20 Claims, 8 Drawing Sheets

(58) Field of Classification Search
CPC ................ B25D 11/064; B25D 11/125; B25D 2250/375; B25D 9/08; B25D 9/10
See application file for complete search history.

(56) References Cited

U.S. PATENT DOCUMENTS

| | | | |
|---|---|---|---|
| 3,708,096 | A | 1/1973 | Burke |
| 3,891,036 | A | 6/1975 | Schmidt |
| 3,892,279 | A | 7/1975 | Amtsberg |
| 4,040,554 | A | 8/1977 | Haytayan |
| 4,075,850 | A | 2/1978 | Nakazato et al. |
| 4,384,623 | A | 5/1983 | Galloni |
| 4,401,251 | A | 8/1983 | Nikolich |
| 4,403,722 | A | 9/1983 | Nikolich |
| 4,483,473 | A | 11/1984 | Wagdy |
| 4,483,474 | A | 11/1984 | Nikolich |
| 4,522,162 | A | 6/1985 | Nikolich |
| 4,549,344 | A | 10/1985 | Nikolich |
| 4,721,240 | A | 1/1988 | Cotta |
| 4,909,419 | A | 3/1990 | Yamada et al. |
| 4,913,331 | A | 4/1990 | Utsumi et al. |
| 5,197,646 | A | 3/1993 | Nikolich |
| 5,263,439 | A | 11/1993 | Doherty et al. |
| 5,556,271 | A | 9/1996 | Zuercher et al. |
| 6,145,724 | A | 11/2000 | Shkolnikov et al. |
| 7,013,985 | B2 | 3/2006 | Sasaki et al. |
| 7,201,301 | B2 | 4/2007 | Moeller et al. |
| 7,290,691 | B1 | 11/2007 | Wen |
| 7,293,684 | B1 | 11/2007 | Wen |
| 7,296,721 | B1 | 11/2007 | Wen |
| 7,325,710 | B1 | 2/2008 | Wen |
| 7,341,171 | B2 | 3/2008 | Moeller et al. |
| 7,438,207 | B2 | 10/2008 | Wu et al. |
| 7,448,524 | B1 | 11/2008 | Liang et al. |
| 8,079,504 | B1 | 12/2011 | Pedicini et al. |
| 8,960,516 | B2 | 2/2015 | Iijima et al. |
| 11,707,827 | B2 | 7/2023 | Zhao |
| 2003/0127238 | A1 | 7/2003 | Largo |
| 2003/0222113 | A1 | 12/2003 | Burke et al. |
| 2004/0079302 | A1 | 4/2004 | Wolf et al. |
| 2005/0098333 | A1 | 5/2005 | Lee |
| 2006/0196682 | A1 | 9/2006 | Mcgee et al. |
| 2007/0075113 | A1 | 4/2007 | Tillinghast et al. |
| 2007/0131731 | A1 | 6/2007 | Moeller et al. |
| 2008/0078799 | A1 | 4/2008 | Wen |
| 2008/0190988 | A1 | 8/2008 | Pedicini et al. |
| 2008/0223900 | A1 | 9/2008 | Tanji |
| 2008/0290131 | A1 | 11/2008 | Liang et al. |
| 2009/0090759 | A1 | 4/2009 | Leimbach et al. |
| 2009/0230166 | A1 | 9/2009 | Yamamoto et al. |
| 2010/0065602 | A1 | 3/2010 | Zhao et al. |
| 2010/0213235 | A1 | 8/2010 | Pedicini et al. |
| 2010/0230461 | A1 | 9/2010 | Tanaka |
| 2010/0327039 | A1 | 12/2010 | Adams |
| 2011/0240709 | A1 | 10/2011 | Oouchi |
| 2011/0290850 | A1 | 12/2011 | Wu |
| 2012/0067935 | A1 | 3/2012 | Liu |
| 2013/0048696 | A1 | 2/2013 | Largo et al. |
| 2013/0134204 | A1 | 5/2013 | Morioka et al. |
| 2014/0090732 | A1 | 4/2014 | Schieler et al. |
| 2014/0374461 | A1 * | 12/2014 | Pedicini .................... B25C 1/06 227/140 |
| 2015/0102084 | A1 | 4/2015 | Zhao |
| 2015/0202755 | A1 | 7/2015 | Tanji |
| 2016/0151900 | A1 | 6/2016 | Wu et al. |
| 2017/0036335 | A1 | 2/2017 | Largo et al. |
| 2019/0375084 | A1 | 12/2019 | Bierdeman et al. |
| 2020/0114500 | A1 | 4/2020 | Bierdeman et al. |

FOREIGN PATENT DOCUMENTS

| | | | |
|---|---|---|---|
| EP | 0252653 | A1 | 1/1988 |
| WO | 2018148007 | A1 | 8/2018 |

OTHER PUBLICATIONS

"International Search Report and Written Opinion", from PCT/US2021/062209, Apr. 4, 2022.

* cited by examiner

FASTENER DRIVING DEVICE

PRIORITY CLAIM

This application is a national phase application of PCT/US2021/062209, filed on Dec. 7, 2021, which claims priority to and the benefit of European Patent Application No. 20214520.7, which was filed on Dec. 16, 2020, the entire contents of which is incorporated herein by reference.

TECHNICAL FIELD

The present disclosure relates to a fastener driving device and particularly, but not exclusively, to a fastener driving device including a pressure chamber and a positive air return system.

BACKGROUND

Combustion powered fastening devices use the expansion of gases generated during an explosion within a combustion chamber to drive a piston. Alternatively, a separate source of pressurised gas can be used to drive the piston. The piston then drives a fastener (for example a nail) from the device into an external object (for example a wall). The piston must return to its original position in order for a second fastener to be loaded and driven.

Incomplete piston return can result in a blank fire or misfire. The device may then have to be manually reset in order to fire again. A blank or misfire can therefore cause delays in firing fasteners. Additionally, the need for a manual reset can expose the user to risk, in the event of uncontrolled firing of a fastener.

It is an aim of certain examples of the present disclosure to solve, mitigate or obviate, at least partly, at least one of the problems and/or disadvantages associated with the prior art. Certain examples aim to provide at least one of the advantages described below.

BRIEF SUMMARY

According to the present disclosure there is provided a fastener driving device comprising: a pressure chamber; a first piston coupled to the pressure chamber such that pressurized gas in the pressure chamber causes the piston to slide from a first position to a second position; a fastener channel configured to receive a fastener, wherein when moving from the first position to the second position the first piston is configured to engage the fastener and drive it from the device; and a second piston slidable within a sleeve and arranged such that when the first piston slides from the first position to the second position the first piston drives the second piston and compresses gas within the sleeve; wherein compressed gas in the sleeve biases the first piston towards the first position.

The pressure chamber may further comprise an exhaust configured to release pressurized gas after a fastener has been driven from the device.

When the force of the compressed gas in the sleeve acting upon the second piston exceeds the force of the gas in the pressure chamber acting upon the first piston, the second piston may act against the first piston to slide the first piston towards the first position.

The fastener driving device may further comprise an additional chamber fluidically linked to the sleeve, the additional chamber being configured to house compressed gas from the sleeve.

The additional chamber may be parallel to or surround the sleeve.

Gas within the sleeve or additional chamber may be pressurised above atmospheric pressure when the first piston is in the second position.

The second piston and sleeve may be positioned on a nose portion of the fastener device.

The second piston and sleeve may be mounted on or parallel to the fastener channel.

The sleeve may further comprise a rebalancing hole, wherein the first piston may be configured to occlude the rebalancing hole when in the second position, the rebalancing hole being open when the first piston is in the first position to couple the sleeve to the outside of the device.

The pressure chamber may be coupled to a pressurised gas reservoir configured to selectively pressurise the pressure chamber to drive the first piston from the first position to the second position.

The fastener driving device may be a combustion fastener driving device, and combustion gas expansion within the pressure chamber may drive the first piston from the first position to the second position.

The pressure chamber may be coupled to the sleeve such that expanded combustion gas is supplied to the sleeve to increase the gas pressure in the sleeve.

The pressure chamber may be coupled to the sleeve via a one-way valve.

BRIEF DESCRIPTION OF THE DRAWINGS

Examples of the present disclosure are further described hereinafter with reference to the accompanying drawings, in which.

DETAILED DESCRIPTION

Figure 1:
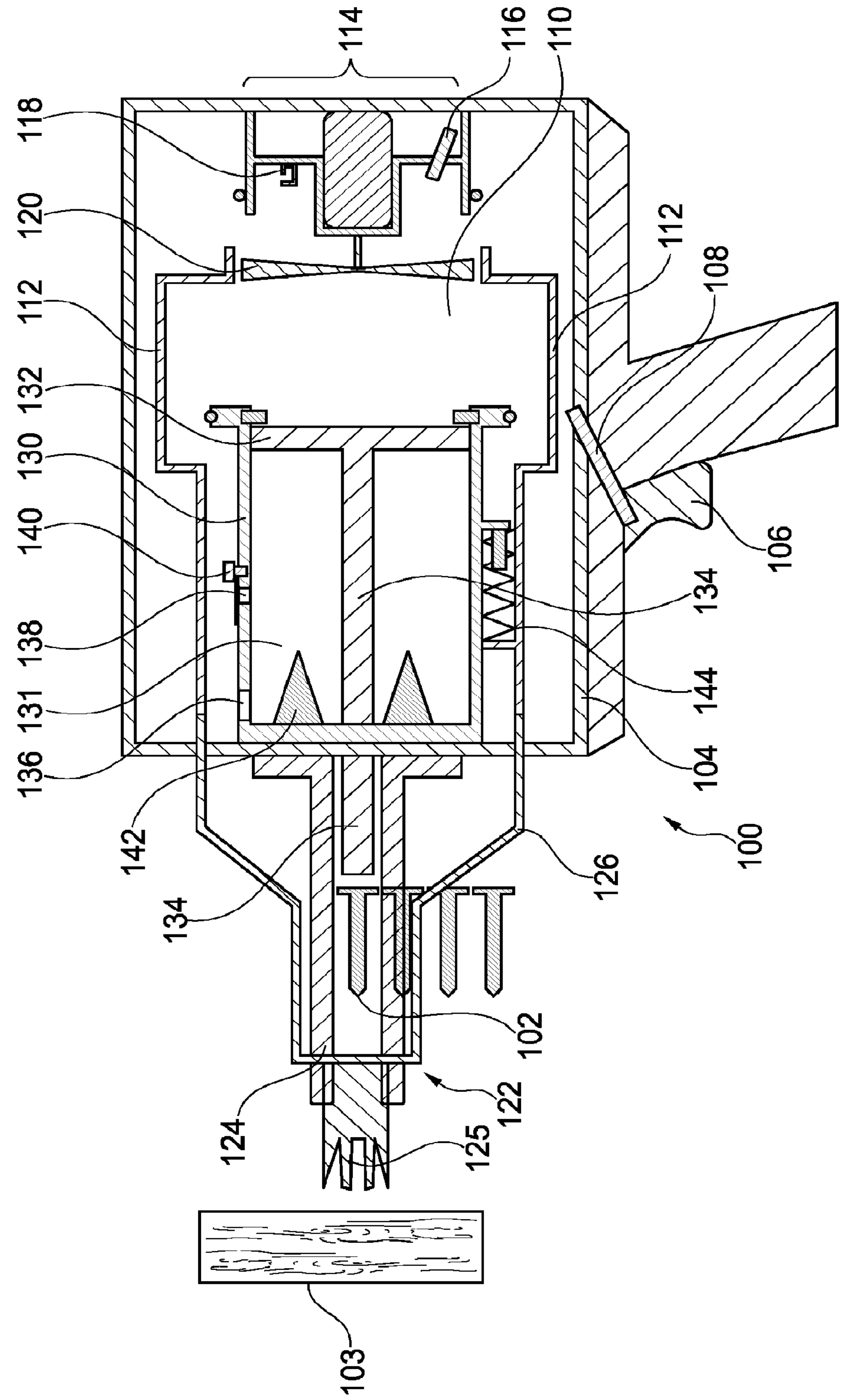
FIG. 1 illustrates a schematic view of an example fastener driving device according to the prior art.

Referring now to FIG. 1 a fastener driving device 100 according to the prior art is shown. FIGS. 2*a* to 2*i* show the process of driving a fastener 102 (for instance, a nail) from the fastener driving device 100.

The fastener driving device 100 may include an exterior housing 104. The exterior housing 104 encloses at least some of the components of the fastener driving device 100. The fastener driving device may also include a trigger 106. In some examples the trigger 106 may be attached to a chamber lockout 108, the purpose of which is explained below in connection with FIG. 2*b*.

The fastener driving device 100 includes a combustion chamber 110 defined by a combustion chamber housing 112. The combustion chamber housing 112 is slidable within the fastener driving device 100. For example, the combustion chamber housing 112 can slide in a direction towards a combustion mechanism 114 and in a direction away from the combustion mechanism 114. The movement of the combustion chamber housing 112 may also be aligned with the direction in which a fastener is driven from the device 100. In this example the combustion mechanism 114 includes a fuel injector 116 and a spark plug 118. The fastener driving device 100 further includes a fan 120 which is configured to disperse fuel injected by the fuel injector 116.

As shown in FIG. 1 the fastener driving device 100 includes a nose portion 122. The nose portion 122 includes a fastener channel 124 and a probe 126. A fastener 102 can be received in the fastener channel 124. The nose portion 122 includes a work contact element 125 to direct the fastener 102 (that is, to allow the user to determine where the fastener 102 is to be driven into an external surface 103). The work contact element 125 may be integral with the probe 126 such that they move together. Furthermore, only when the work contact element 125 is pressed against an external surface 103 can the fastener driving device 100 be fired. The work contact element 125 being pressed against the external surface 103 may trigger a switch (not shown) to allow the fastener driving device 100 to fire, for example. As will be explained below, when the work contact element 125 is pressed against the external surface 103 it is depressed into nose portion 122, which activates the firing mechanism and is a necessary condition for a fastener 102 to be discharged. Accordingly, the work contact element 125 also serves as a mechanism by preventing a fastener 102 from being fired other than directly into an external surface 103.

The probe 126 may extend toward the combustion chamber housing 112. In this way the probe 126 is integral with or coupled to the combustion chamber housing 112. The probe 126 may form part of the walls of the combustion chamber 110.

Figure 2A:
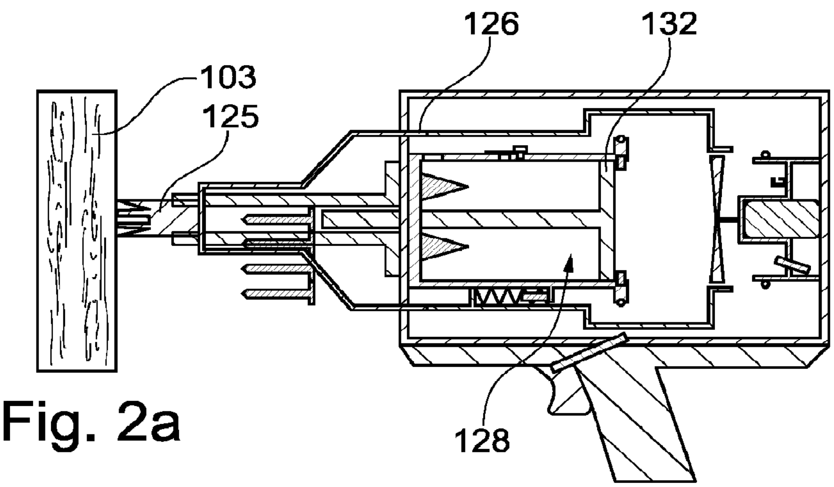
FIGS. 2*a* to 2*i* illustrate schematic views of the fastener driving device of FIG. 1 driving a fastener.
Figure 2B:
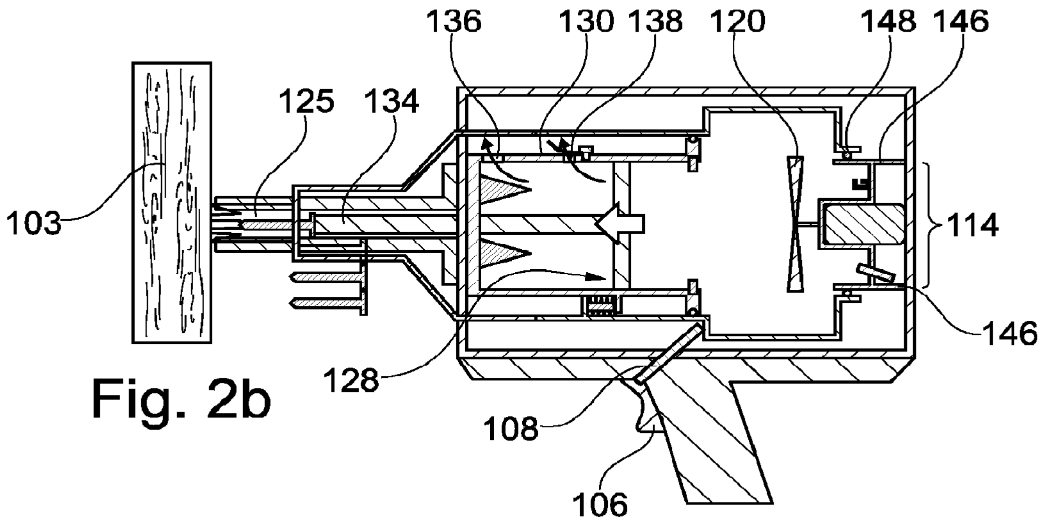
Figure 2C:
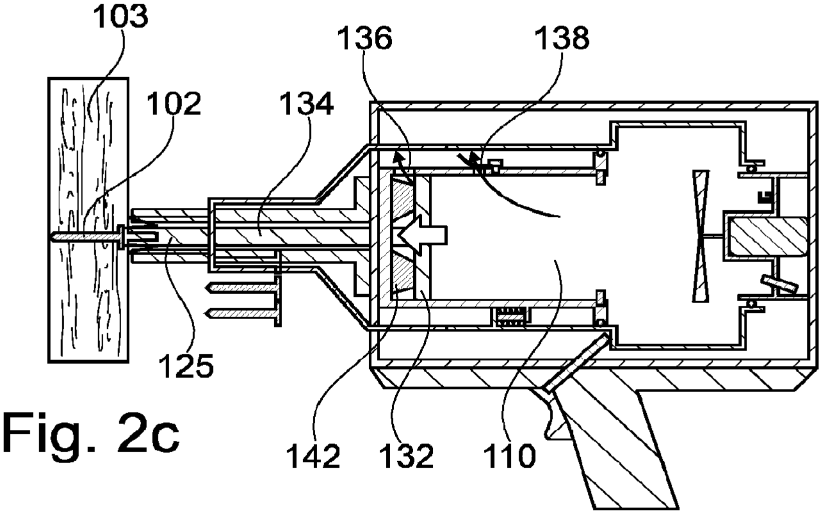

As shown in FIGS. 2*a* and 2*b* when the work contact element 125 is pushed against an external surface 103 the work contact element 125 moves into the nose portion 122. The probe 126 in turn pushes against the combustion chamber housing 112, such that the combustion chamber 110 slides back away from the work contact element 125. The combustion chamber housing 112 then forms a sealed combustion chamber (sealed with O-rings or other forms of seal) with the combustion mechanism 114, shown in FIG. 2*b*. The fastener driving device 100 will not fire until the combustion chamber housing 112 has been slid such that combustion chamber 110 is sealed. Owing to the coupling between the probe 126 and the combustion chamber housing 112, pressing the work contact element 125 against the external surface 103 directly closes the combustion chamber 110, thus only permitting the device 100 to be fired when in a firing position. The pulling of the trigger 106 when the combustion chamber 110 has moved into the sealed position allows the chamber lockout 108 to engage with the combustion chamber housing 112. This prevents return of the combustion chamber 110 during firing. Also, until the work contact element 125 has been depressed and the combustion chamber housing 112 has slid back, the chamber lockout 108 will not be able to move back when the trigger 106 is pulled (this being evident by comparison of FIGS. 2*a* and 2*b*). Accordingly, until the device 100 is in a firing position, the trigger 108 cannot be fully pulled to activate the firing mechanism.

In this example the combustion chamber housing 112 contacts a sealing element 148 on a wall 146 of the combustion mechanism 114. This then triggers the fan 120 to start and fuel is injected into the combustion chamber 110 and dispersed by the fan 120. When the trigger 106 is subsequently pulled the spark plug 118 ignites the fuel. By injecting fuel as soon as the combustion chamber 110 is closed, rather than waiting until the trigger 106 is pulled, firing delay is minimised.

The combustion of the fuel results in a temperature increase, which increases the volume and therefore the pressure of gas within the sealed combustion chamber 110. The expansion of the combustion gases within the combustion chamber 110 acts upon a face of piston 128 which faces into the combustion chamber 110. Gas pressure in the combustion chamber 110 drives the piston 128 from a first position (shown in FIG. 2*a*) toward the second position (shown in FIG. 2*c*). FIG. 2*b* shows piston 128 in an intermediary position. The gases may do this by exerting force on a plate 132. The plate 132 can be sized to contact the interior walls of a sleeve 130 so as to form a seal between the sleeve 130 and the combustion chamber 110. As the piston 128 moves within the sleeve 130 gases contained within the sleeve 130 escape via a vent 136 and an exhaust 138 (illustrated by the arrows in FIG. 2*b*). In some examples, the sleeve 130 may include a plurality of vents 136 and/or exhausts 138 around the perimeter of the sleeve 130. The exhaust 138 may not be present in every example.

The sleeve 130 may include a bumper 142 or other resilient device or in some cases a plurality of bumpers 142. The bumpers 142 are positioned in the sleeve 130 so that the bumpers 142 are impacted upon when the piston 128 moves to the second position. In this way the bumpers 142 are at an end of the sleeve 130 and provide protection from any impact forces of the piston 128 to that end of the sleeve 130. The bumpers 142 further serve to encourage the return of piston 128 towards the first position as they rebound.

The piston 128 includes a drive blade 134 extending from the plate 132 towards a fastener 102 located in a fastener channel 124 defined within the nose portion 122. The drive blade 134 sits partially within the fastener channel 124 and therefore slides within it. During firing, the plate 132 pushes the drive blade 134, which then contacts the fastener 102 and pushes it from the fastener driving device 100, through the fastener channel 124.

The drive blade 134 may pass through the base of the sleeve 130 into the fastener channel 124. In this example a sealing O-ring is positioned at the end of the sleeve around the drive blade 134 to prevent gases escaping the sleeve 130 around the drive blade 134.

The exhaust 138 is spaced apart from the vent 136. In this example, the exhaust 138 is positioned on the sleeve 130 closer to the combustion mechanism 114 than the vent 136. The exhaust 138 may include a one-way valve 140. The one-way valve 140 covering the exhaust 138 is orientated such that gas can move out of the sleeve 130 or combustion chamber 110 (dependent on the position of the piston 128) but not enter either the combustion chamber 110 or the sleeve 130.

Before the piston 128 reaches the second position, the plate 132 of the piston 128 moves past the exhaust 138. This allows the combustion gases to escape from the combustion chamber 110 via the exhaust 138, which partially reduces the gas pressure in the combustion chamber 110. At this time the piston 128 has already been fully accelerated and will continue to move towards the second position even under the reduced gas pressure.

Figure 2D:
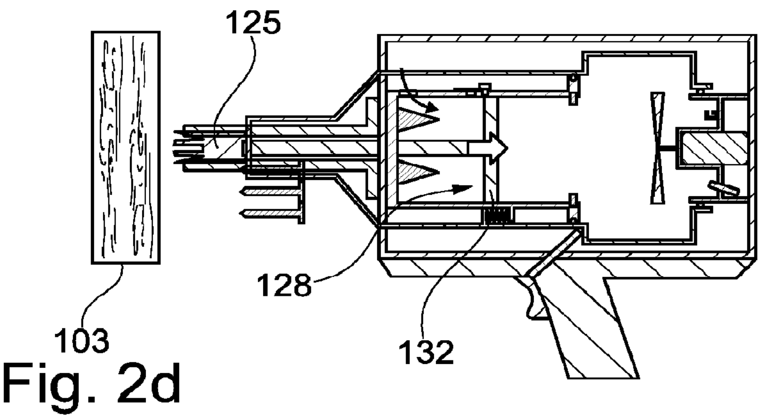
Figure 2E:
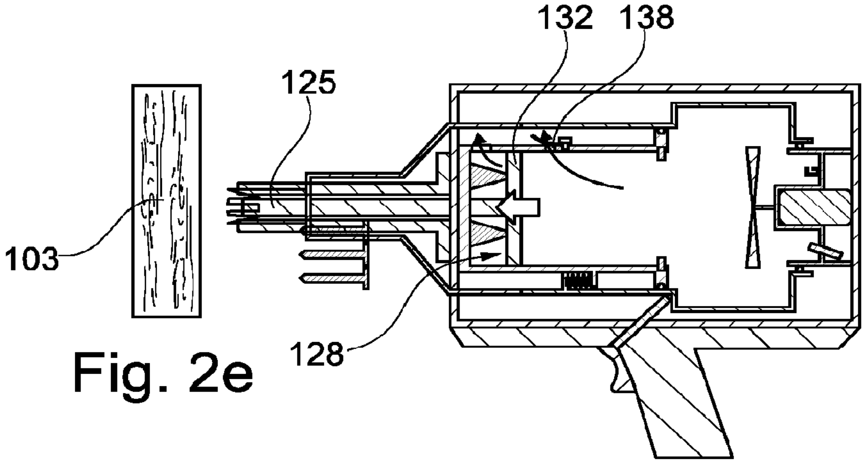

When the piston 128 is in the second position the plate 132 impacts upon the bumpers 142. In some examples the plate 132 may then rebound from the bumpers 142 and then impact the bumpers 142 a second time, as is shown in FIGS. 2*d* and 2*e*. A piston rebound is an undesired event. For example, piston rebound can lead to double drive blade impact on the external surface, which may be unsightly or against building regulations. In some cases a large rebound can lead to double fastener fire by engagement of a further fastener in the channel. Furthermore, piston rebound can affect the exhaust efficiency of the burned combustion gases because the piston 128 moves towards the first position during the rebound and so moves past the exhaust 138. In this way no combustion gases can be exhausted from the combustion chamber 110 during at least a portion of the piston rebound. Moreover a piston rebound increases the return piston time which decreases shot-to-shot speed.

Figure 2F:
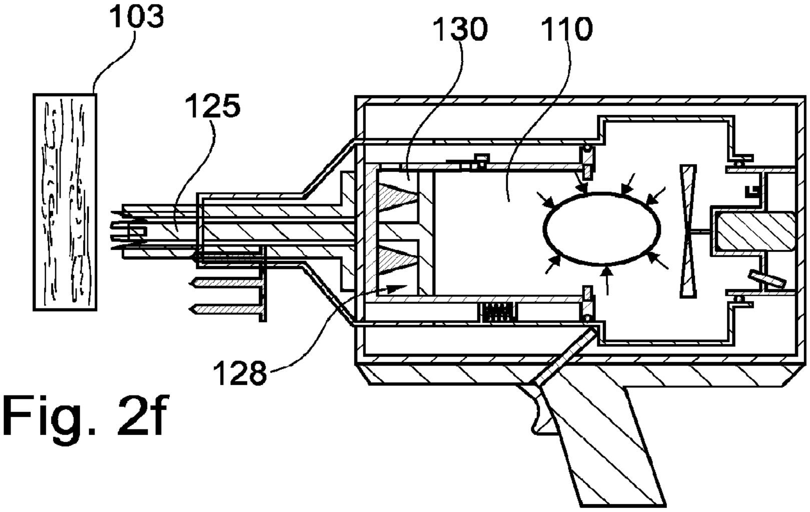
Figure 2G:
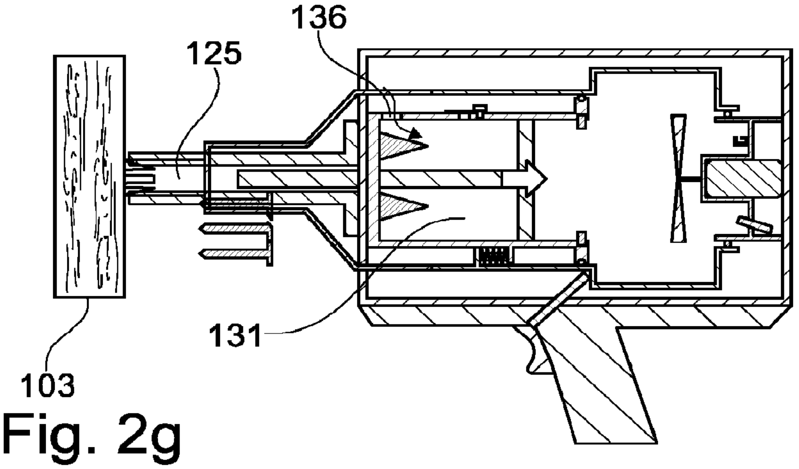

FIG. 2*f* shows the piston 128 in the second position. The second position may be where the plate 134 is in contact with the bumpers 142, for example. In the combustion chamber 110, once the fuel has been combusted, the gases in the combustion chamber 110 cool, which creates a vacuum. The exhaust 138 having a one-way valve 140 prevents gases retuning to the combustion chamber 110. The vacuum therefore encourages piston 128 to slide towards the first position. As vent 136 does not include a one-way valve, gas can re-enter the sleeve 130 via the vent 136 as shown by the arrow in FIG. 2*g*. In the figures the probe 126 is extending around the sleeve 130. However, probe 126 may not be continuous around the circumference of sleeve 130: it may include gaps or comprise only a think element coupling the work contact element 125 with the combustion chamber wall 112. Accordingly, vent 136 and exhaust 138 effectively communicate with the ambient environment outside of the device 100.

Figure 2H:
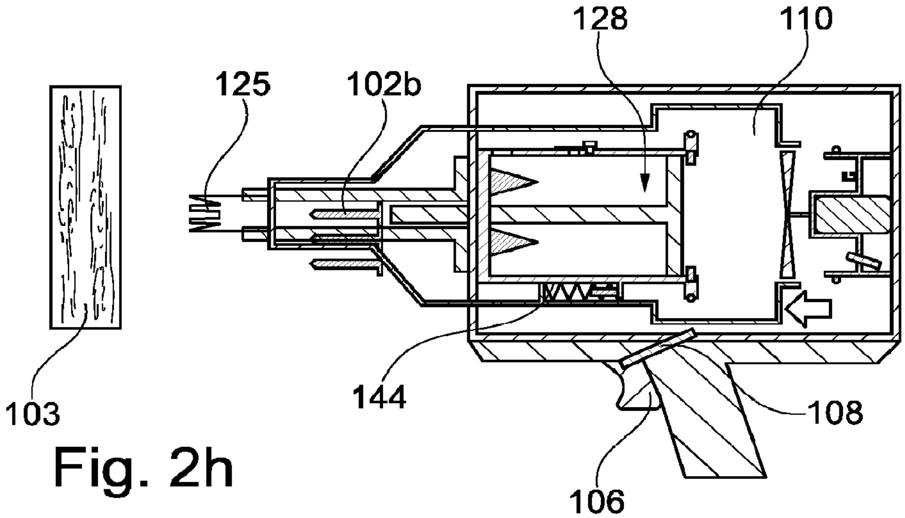
Figure 2I:
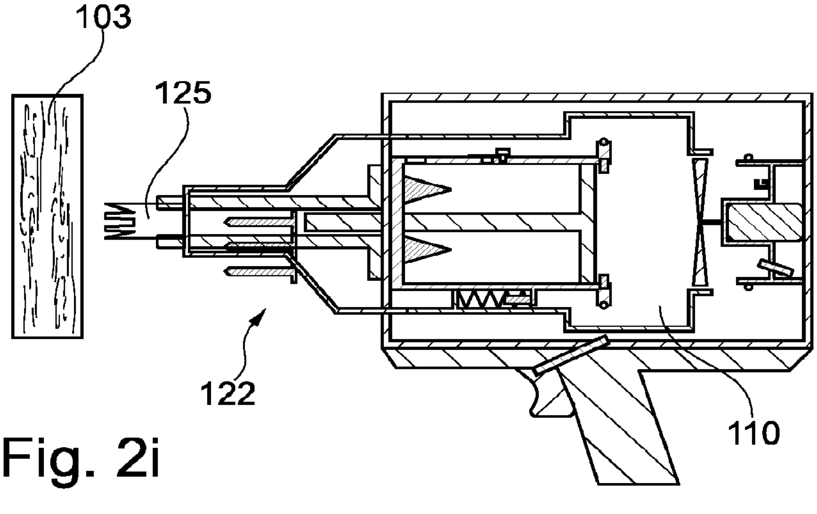

As shown in FIG. 2*h*, the fastener driving device may also include a chamber spring 144. The chamber spring 144 may be attached to the combustion chamber housing 112 so as to provide a biasing force against the sliding motion of the combustion chamber 110. That is, when the combustion chamber 110 is moved by the probe 126, such that the combustion chamber 110 is sealed, the spring 144 is compressed. After the fastener 102 is fired the device 100 may be moved away from the external surface 103 by the user. When the trigger 106 is released by the user (releasing lockout 108) spring 144 acts to move the combustion chamber 110 into its initial position as indicated by the arrow. This opens the combustion chamber 110 by the wall 112 separating from seal 148 about the combustion mechanism 114 to allow for air scavenging (that is, fresh air replenishing the combustion chamber 110). A second fastener 102*b* is drawn into nose 122 and aligned for firing the next shot shown in FIG. 2*i*. The mechanism for supplying fasteners 102 may be entirely conventional and so will not be further described.

Movement of the combustion chamber wall 112 may also open the combustion chamber 110 about the outside of sleeve 130 (the side of the combustion chamber 110 opposite to the combustion mechanism 114). When the work contact element 125 is depressed, this side of the combustion chamber wall 112 is also sealed by an O-ring about the sleeve 130.

The cycle for firing a fastener 102 requires a period of driving the fan 120, plus additional time to spark and ignite the fuel. To allow for piston 128 to move to the second position and return to the first position the trigger 106 is disabled to prevent an attempt at a further shot. The trigger 106 may be electronically disabled, that is a switch detection may be ignored when the trigger 106 is disabled. Once the combustion chamber 110 is opened a period of scavenging time is required. The cycle duration from the pressing of the work contact element 125 against the external surface to the fastener driving device 100 being ready for the next shot is therefore typically between 300 ms and 500 ms.

Figure 3:
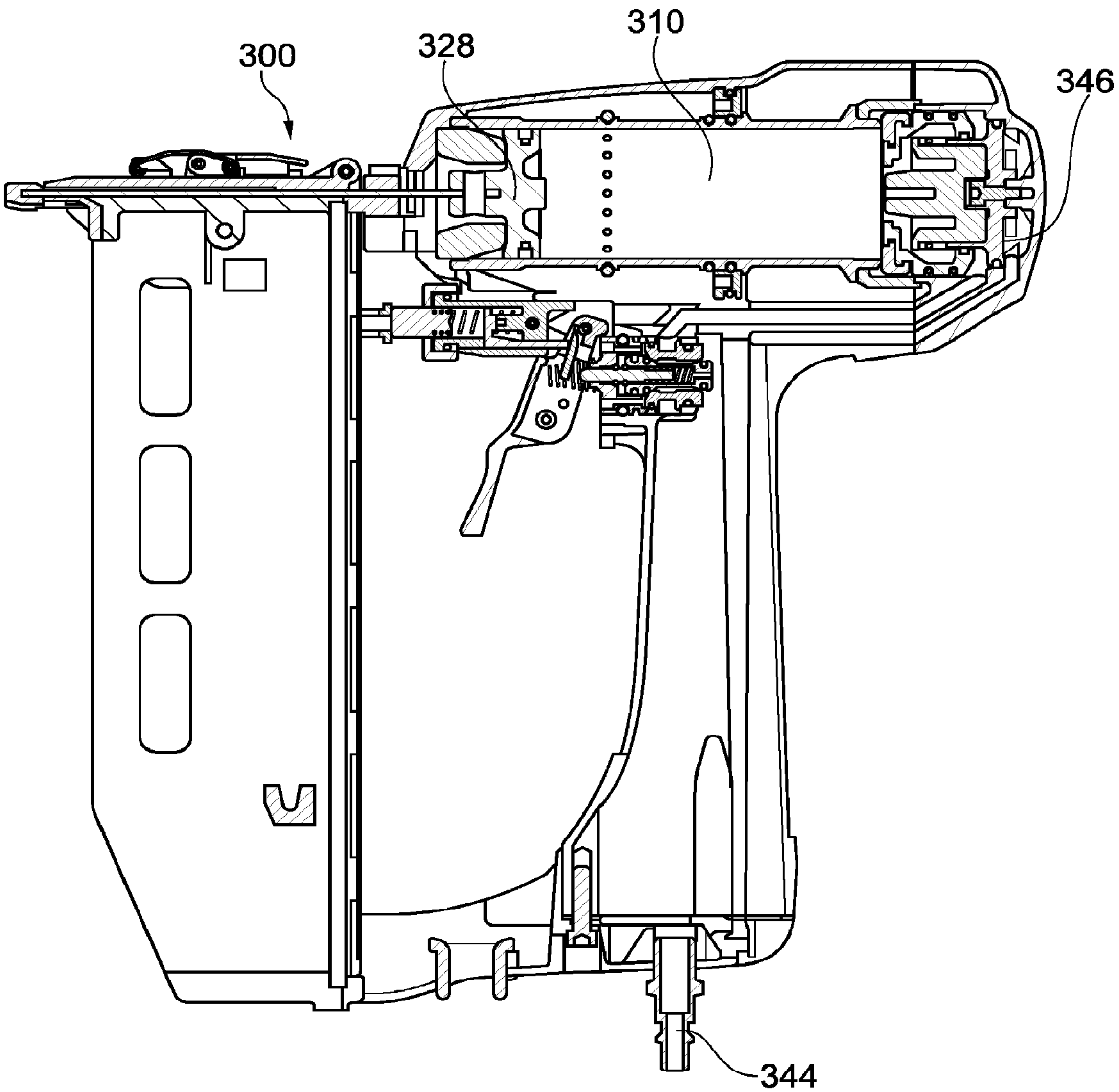
FIG. 3 shows a schematic view of an example of a pneumatic fastener driving device according to the prior art.

Alternatively, a fastener driving device 300 may be a pneumatically operated as shown in FIG. 3. The fastener driving device 300 includes a chamber 310 and a piston 328 configured to drive a fastener (not shown). The piston 328 slides between a first position (not shown) and a second position shown in FIG. 3. In this example the piston 328 includes a plate 334 and a drive blade 336 similar to drive blade 134 as described above.

Before firing, the piston 328 is in the first position. When the trigger is pulled the chamber 310 is filled with pressurised gas from a pressurised source connected to the fastener driving device 300 via an intake channel 344. This pushes the piston 328 into the second position thereby firing the fastener from the device 300. The chamber 310 is fed until a user release the trigger. A valve then closes the intake channel so pressurised gas is no longer fed into the chamber 310 and opens an exhaust 346.

The chamber 310 is therefore depressurised via the exhaust 346. The piston 328 may be returned to its initial position using a conventional mechanism, for instance a positive air return chamber (not shown) that acts when the pressure in the return chamber exceeds the pressure of chamber 310 to move the piston back to the first position. However this conventional approach requires a relatively long time between shots.

Figure 4A:
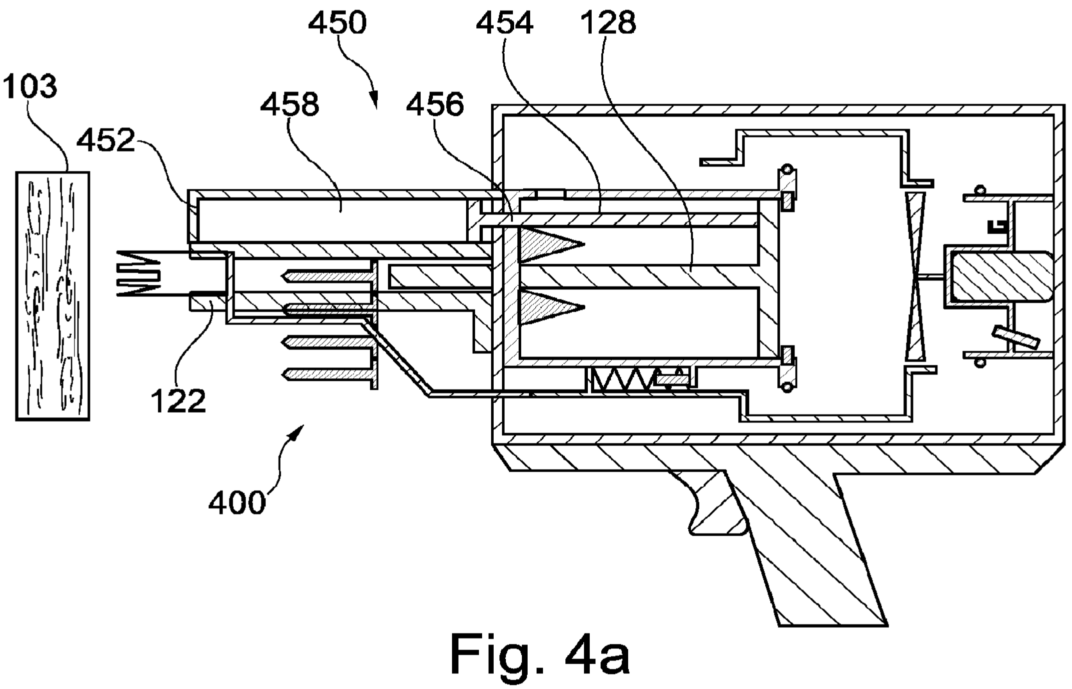
FIGS. 4*a* to 4*d* illustrate schematic views of an example fastener driving device according to the present disclosure.

Turning now to FIG. 4*a*, a fastener driving device 400 according to an example of the present disclosure includes a pneumatic spring 450 to speed up the piston return. FIG. 4*a* illustrates an example of the present disclosure for a combustion powered fastener driving device. However, in accordance with another example of the present disclosure the pneumatic spring 450 may be incorporated into a pneumatically powered fastener driving device. The pneumatic spring 450 includes a sleeve 452 and a second piston 454.

In this example, the pneumatic spring is arranged on the nose portion 122 of the fastener driving device 400. The second piston 454 is arranged relative to the first piston 128, such that as shown in FIG. 4*a*, when the first piston 128 is in the first position the second piston 454 is extended towards the first piston 128 to give a maximum volume of sleeve space 458 within the second sleeve 452.

Figure 4B:
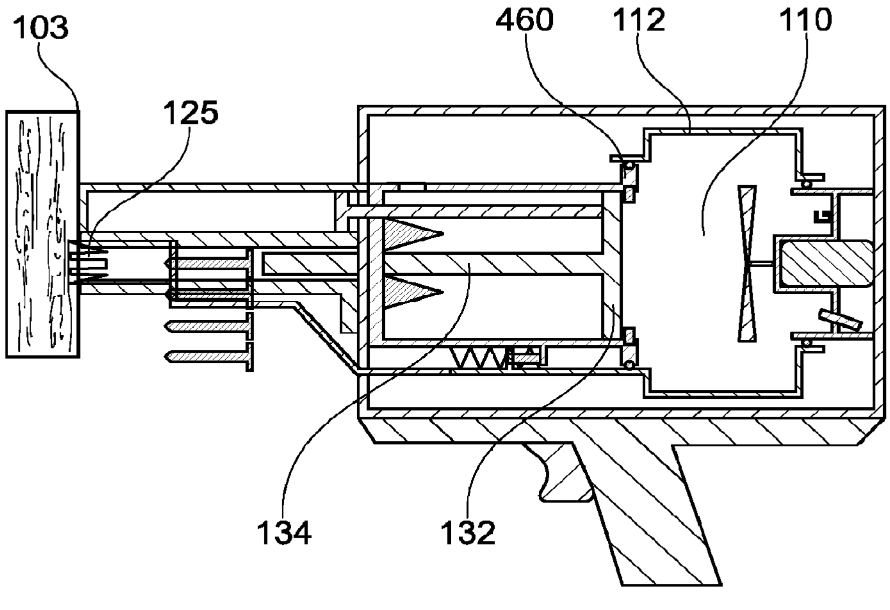

FIG. 4*a* shows the combustion chamber 110 in the open position. FIG. 4*b* shows the work contact element 125 pushed against an external surface 103. The work contact element 125 being pushed into the nose portion 122 moves the probe 126 which also pushes the combustion chamber 110 backwards. In this way, the combustion housing 112 contacts a seal ring 460 around the periphery of the sleeve 130 and forms a sealed combustion chamber 110.

Figure 4C:
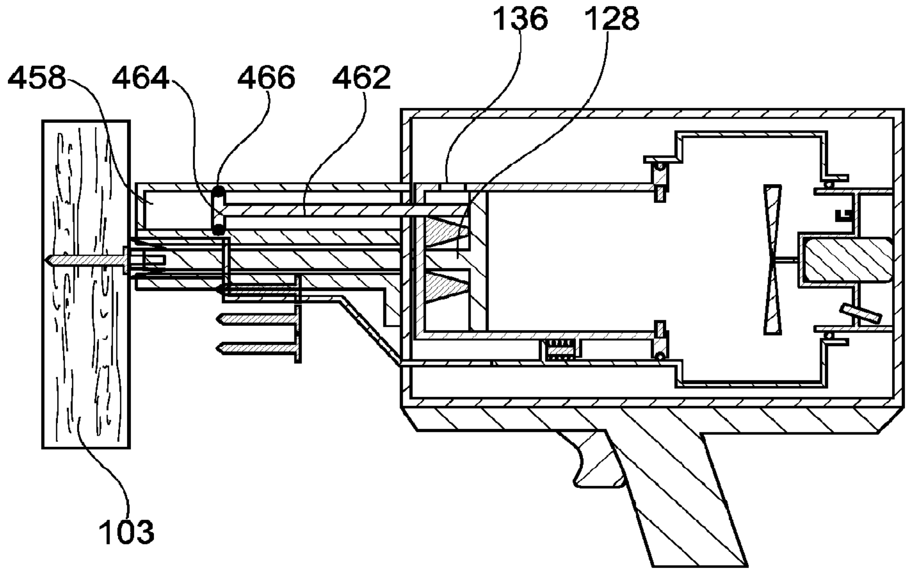

Expansion of the combustion gases drive the first piston 128 to the second position, shown in FIG. 4*c*. Gases within the sleeve 130 escape through a vent 136, such that there is minimal gas compression within the sleeve 130 of the first piston 128. The movement of the first piston 128 to the second position allows the first piston 128 to engage with the second piston 454 to move the second piston 454 to a second position. For example, a drive blade 462 of the second piston 454 may engage with the plate 132 of the first piston 128. The movement of the plate 132 pushes against the drive blade 462 of the second piston 454, which then moves a plate 464 (of the second piston 454). The plate 464 is attached to the drive blade 462 at an end opposed the end of the drive blade 454 which contacts the first piston 128. The plate 464 of the second piston 454 may have a sealing ring 466 around the periphery so as to contact the interior walls of the sleeve 452. Further in some examples the second sleeve 452 may include a bumper (not shown) for the second piston to impact upon in the second position.

In this example when the second piston 454 is in the second position the sleeve space 458 volume is reduced to a minimum. In this way, the movement of the second piston 454 from the first position into the second position compresses the gas within the second sleeve 452. This compression of gases within the sleeve space 458 provides a force biasing the second piston 454 (and thereby the first piston 128) toward the first position.

In some examples the gas within the second sleeve 452 may be pressurised above atmospheric pressure to give a higher biasing force on the second piston 454. For example the pressure in the second sleeve may be 4 BarA. During firing, the pressure from the expanding combustion gases within the combustion chamber 110 overcomes this biasing force, driving the fastener 102 from the fastener driving device 400.

Figure 4D:
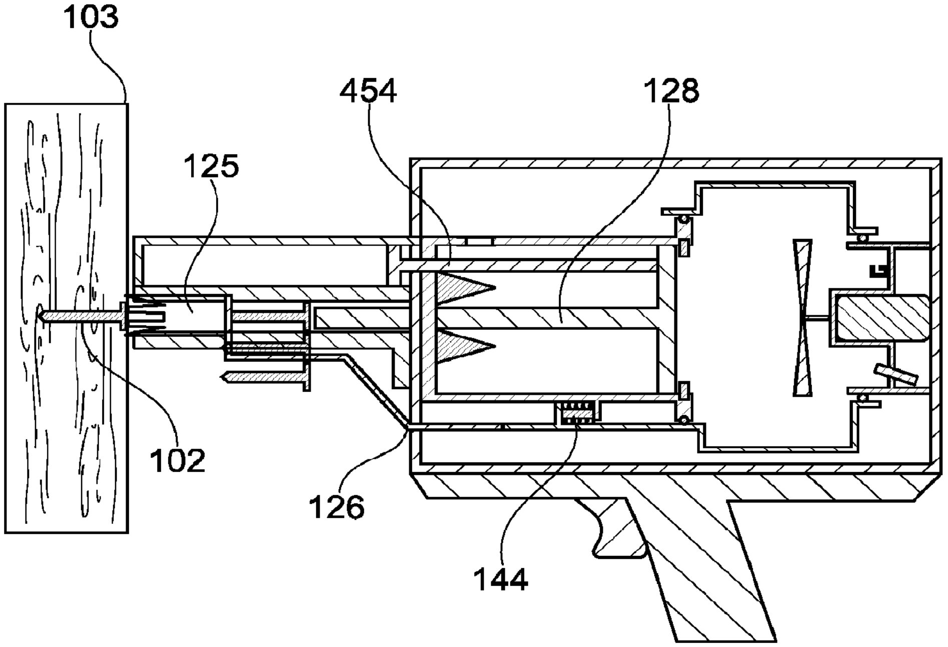

As shown in FIG. 4*d* once combustion has occurred and the gases within the combustion chamber 110 cool the pressure in the sleeve space 458 acting upon the second piston 454 can generate a force that exceeds the force upon the first piston 128 exerted by the residual pressure in the combustion chamber 110. The pressure in the sleeve space 458 therefore acts to slide the second piston 454 to the first position. The sliding of the second piston 454 to the first position acts to also slide the first piston 128 back to the first position.

Once the first piston 128 is in the first position and the work contact element 125 is no longer pressed against the external surface the chamber spring 144 acts to reopen the combustion chamber 110 by sliding it towards the work contact element 125.

In other examples, the combustion chamber 110 may be opened by the recoil of the fastener driving device 400. That is, as the fastener driving device 400 moves away from the external surface 103, the work contact element 125 is pushed out of the nose portion by the spring 144. This opens the combustion chamber 110 via the probe 126. The second piston 454 then biases the first piston 128 back to the first position.

Figure 5:
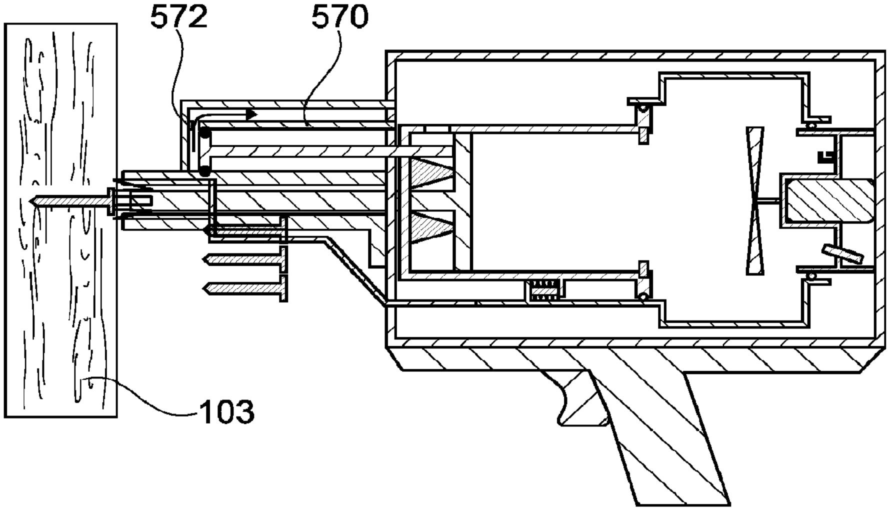
FIG. 5 illustrates a schematic view of a further example fastener driving device according to the present disclosure.

FIG. 5 shows a fastener driving device 500 according to a further example of the present disclosure, where the pneumatic spring 450 includes an additional chamber 570 which is configured to extend the second sleeve. In this way when the second piston 454 moves to the second position the compressed gas is at least partially contained by the additional chamber 570. In this example the additional chamber 470 forms part of the sleeve space 458 to give the same volume of space 458 as described with reference to FIG. 4. The additional chamber 570 may be linked to the second sleeve 452 via a vent 572, with gas able to flow between the two as indicated by the arrow. The vent 572 may be behind the plate 464 of the second piston. The gas within the sleeve 452 and the additional chamber 570 is pressurised by movement of the second piston 454 into the second position. In some examples the additional chamber 570 (and the sleeve space 458) may be pressurised above atmospheric pressure. By having the additional chamber 570 the length of the second sleeve can be reduced compared to the example of FIGS. 4*a* to *d*. This allows the user a better line of sight to the work contact element 125.

Figure 6:
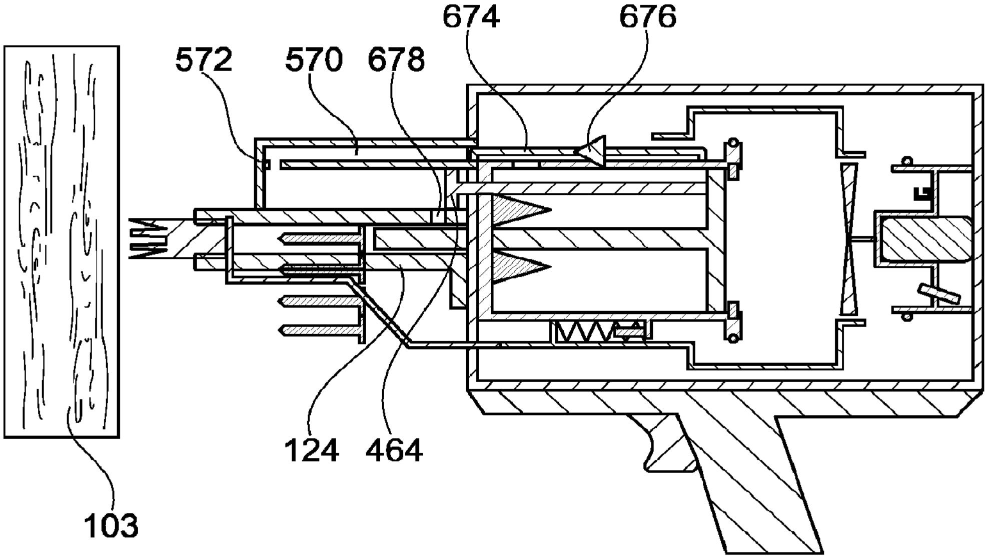
FIG. 6 illustrates a schematic view of a yet further example fastener driving device according to the present disclosure.

FIG. 6 illustrates a yet further example of the fastener driving device 600 further including a channel 674 from the combustion chamber 110 to the second sleeve 452. The channel 674 may include a one-way valve 676, such as a reed valve, to prevent return flow of gases from the additional chamber 570 to the combustion chamber 110.

In this example, combustion gases from the combustion chamber 110 enter the additional chamber 570 and further pressurise the sleeve 452 while the pistons 128, 454 move from the first position to the second position. The force biasing the second piston 454 towards the first position is therefore increased (or alternatively the capacity of the sleeve 452 may be reduced). Once combustion has concluded, the return to the first position for both the first and second pistons is therefore sped up due to the high biasing force of the pressurized second sleeve 425.

In this example the pneumatic spring 450 further includes a depressurisation hole 678 to the fastener channel 124. When the second piston 454 is sliding form the first position to the second position or in the second position the plate 464 of the second piston 454 seals the depressurisation hole 678 from the additional chamber 570.

The depressurisation hole 678 is configured to be uncovered when the second piston 454 is in the first position. That is the depressurisation hole 678 allows the second sleeve 452 to be fluidically linked to the fastener channel 124 and thereby the exterior of the fastener driving device. The depressurisation hole 678 therefore allows the pressure within the second sleeve 452 and the additional chamber 570 to rebalance after a shot is fired while allowing the pressure within the second sleeve 452 to increase during the shot.

In the examples described above the pneumatic spring 450 is shown on a combustion driven fastener device, however the pneumatic spring 450 could equally be applied to the pneumatic fastener driving device 300 as shown in FIG. 3. Accordingly, after the chamber 310 has been pressurised by the pressure reservoir the piston 328 compresses a secondary piston in the manner described above. Similarly the secondary piston then biases the first piston 328 back to the first position once the chamber 310 pressure is exhausted.

The above-described embodiments provide the advantage of improving piston return time. This can therefore reduce time between firings. The need for a chamber lockout is also eliminated, thereby allowing for even less time between successive shots.

Further a pneumatic spring may be more resilient to the high speeds and pressures exerted upon it than a mechanical spring.

Compared with a positive air return system the energy loss from a pneumatic spring is significantly lower and the sleeve space required is less than a return chamber of positive air return systems, thus allowing for a better line of sight.

Throughout this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise. Throughout this specification, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers or characteristics described in conjunction with a particular aspect or example of the present disclosure are to be understood to be applicable to any other aspect or example described herein unless incompatible therewith. All of the features disclosed in this specification, and/or all of the steps of any method or process so disclosed, may be combined in any combination, except combinations where at least some of such features and/or steps are mutually exclusive. The present disclosure is not restricted to the details of any foregoing examples. The present disclosure extends to any novel feature or combination of features disclosed in this specification. It will be also be appreciated that, throughout this specification, language in the general form of "X for Y" (where Y is some action, activity or step and X is some mechanism for carrying out that action, activity or step) encompasses mechanism X adapted or arranged specifically, but not exclusively, to do Y.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A fastener driving device comprising:

a pressure chamber;

a first piston coupled to the pressure chamber such that pressurized gas in the pressure chamber causes the first piston to slide from a first position to a second position;

a fastener channel configured to receive a fastener, wherein when moving from the first position to the second position, the first piston is configured to engage a fastener and drive the fastener through the fastener channel and from the fastener driving device;

a sleeve; and a second piston slidable within the sleeve and configured such that when the first piston slides from the first position to the second position, the first piston drives the second piston and compresses gas within the sleeve, wherein compressed gas in the sleeve biases the first piston towards the first position.

2. The fastener driving device of claim 1, wherein the pressure chamber comprises an exhaust configured to release pressurized gas after the fastener has been driven from the fastener driving device, and wherein when force of the compressed gas in the sleeve acting upon the second piston exceeds force of the gas in the pressure chamber acting upon the first piston, the second piston acts against the first piston to slide the first piston towards the first position.

3. The fastener driving device of claim 2, which comprises an additional chamber fluidically linked to the sleeve, the additional chamber configured to house compressed gas from the sleeve.

4. The fastener driving device of claim 3, wherein the additional chamber is parallel to or surrounds the sleeve.

5. The fastener driving device of claim 4, wherein gas within the sleeve or the additional chamber is pressurized above atmospheric pressure when the first piston is in the second position.

6. The fastener driving device of claim 5, which includes a nose portion and wherein the second piston and sleeve are positioned on the nose portion.

7. The fastener driving device of claim 6, wherein the second piston and sleeve are mounted on or parallel to the fastener channel.

8. The fastener driving device of claim 7, wherein the sleeve defines a rebalancing hole, wherein the first piston is configured to occlude the rebalancing hole when in the second position, and wherein the rebalancing hole is open when the first piston is in the first position to couple the sleeve to outside of the fastener driving device.

9. The fastener driving device of claim 8, wherein the pressure chamber is coupled to a pressurized gas reservoir configured to selectively pressurize the pressure chamber to drive the first piston from the first position to the second position.

10. The fastener driving device of claim 9, which is a combustion fastener driving device, and wherein combustion gas expansion within the pressure chamber drives the first piston from the first position to the second position.

11. The fastener driving device of claim 10, wherein the pressure chamber is coupled to the sleeve such that expanded combustion gas can be supplied to the sleeve to increase the gas pressure in the sleeve.

12. The fastener driving device of claim 11, wherein the pressure chamber is coupled to the sleeve via a one-way valve.

13. The fastener driving device of claim 1, which comprises an additional chamber fluidically linked to the sleeve, the additional chamber configured to house compressed gas from the sleeve.

14. The fastener driving device of claim 13, wherein the additional chamber is parallel to or surrounds the sleeve.

15. The fastener driving device of claim 14, wherein gas within the additional chamber is pressurized above atmospheric pressure when the first piston is in the second position.

16. The fastener driving device of claim 1, wherein gas within the sleeve is pressurized above atmospheric pressure when the first piston is in the second position.

17. The fastener driving device of claim 1, which includes a nose portion and wherein the second piston and sleeve are positioned on the nose portion.

18. The fastener driving device according to claim 17, wherein the second piston and sleeve are mounted on or parallel to the fastener channel.

19. The fastener driving device of claim 1, wherein the sleeve defines a rebalancing hole, wherein the first piston is configured to occlude the rebalancing hole when in the second position, and wherein the rebalancing hole is open when the first piston is in the first position to couple the sleeve to outside of the fastener driving device.

20. The fastener driving device of claim 1, wherein the pressure chamber is coupled to a pressurized gas reservoir configured to selectively pressurize the pressure chamber to drive the first piston from the first position to the second position.

* * * * *